(12) United States Patent
Lang et al.

(10) Patent No.: US 7,637,683 B2
(45) Date of Patent: Dec. 29, 2009

(54) SLIDING STRUCTURE

(75) Inventors: Werner Lang, Ergersheim (DE); Jaap-Jan Snel, Windsheim (DE); Stefan Centmayer, Ergersheim (DE)

(73) Assignee: Lang Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 11/899,067

(22) Filed: Sep. 4, 2007

(65) Prior Publication Data

US 2008/0063465 A1    Mar. 13, 2008

(30) Foreign Application Priority Data

Sep. 4, 2006    (DE)    .................. 10 2006 041 432

(51) Int. Cl.
*F16D 1/12*    (2006.01)
*F16D 1/104*   (2006.01)

(52) U.S. Cl. .................. 403/87; 248/481; 359/876

(58) Field of Classification Search .................. 403/70, 403/71, 87, 94, 96, 119, 123, 145; 248/477, 248/479, 481; 359/872, 874, 876

See application file for complete search history.

(56) References Cited

U.S. PATENT DOCUMENTS

| | | | | |
|---|---|---|---|---|
| 3,512,746 A * | 5/1970 | Vitaloni et al. | .............. | 248/483 |
| 3,539,234 A * | 11/1970 | Rapata | ........................ | 384/203 |
| 3,841,769 A * | 10/1974 | Bowerman | .................. | 403/90 |
| 4,620,813 A * | 11/1986 | Lacher | ........................ | 403/93 |
| 5,588,767 A * | 12/1996 | Merlo | ........................ | 403/128 |
| 5,623,742 A * | 4/1997 | Journee et al. | ........... | 15/250.34 |
| 5,629,810 A * | 5/1997 | Perry et al. | .................. | 359/872 |
| 6,109,815 A * | 8/2000 | Merlo | ........................ | 403/90 |
| 6,152,640 A | 11/2000 | Oda et al. | | |
| 6,280,090 B1 | 8/2001 | Stephens et al. | | |
| 6,702,502 B1 * | 3/2004 | Graber et al. | .................. | 403/34 |
| 6,877,709 B2 * | 4/2005 | March et al. | ................ | 248/549 |
| 7,156,358 B2 * | 1/2007 | March et al. | ................ | 248/549 |
| 2004/0227049 A1 * | 11/2004 | Lang et al. | ................... | 248/476 |
| 2006/0274443 A1 * | 12/2006 | Lang et al. | ................... | 359/879 |

* cited by examiner

*Primary Examiner*—Daniel P Stodola
*Assistant Examiner*—Joshua T Kennedy
(74) *Attorney, Agent, or Firm*—McNair Law Firm, P.A.; Seann P. Lahey

(57) ABSTRACT

A sliding structure and a joint member, which are provided with a sliding means which substantially eliminates the so-called Stick-Slip effect. This is achieved through the provision of free ends of a plurality of projections, sliding upon the surface of a complementary opposed and facing surface. By appropriately dimensioning the individual free end contact surfaces of the projections and by selectively varying in the number of the projections per area unit, the difference between the initial still-stand holding effect and the sliding friction in the case of selected material pairings is considerably reduced. The force, which is necessary to set the two sliding components into motion, relative to one another, is then only insignificantly greater than the force necessary to overcome dynamic or sliding friction. The Stick-Slip effect is known and unavoidable in a case with a sliding pair of unfavorable materials and, in this manner, can be effectively reduced. The final result is that materials can now be employed in accord with the invention, which are selected for advantageous properties, such as, for example, structural strength. In this way, the expensive installation of an auxiliary sliding plate or special sliding layer is eliminated.

8 Claims, 3 Drawing Sheets

SLIDING STRUCTURE

BACKGROUND OF THE INVENTION

The invention concerns a sliding structure which may include a linked component for use with mirror positioning apparatus.

SUMMARY OF THE INVENTION

For effective positioning of reflective panes in external, rear view mirrors of vehicles, linked devices possessing a sliding structure are installed. Such a sliding structure encompasses two defined sliding surfaces which face one another. The two sliding surfaces or the mutually sliding parts, are connected by a binding member, which causes the parts to press against one another with known force. By an appropriate selection of the sliding materials and by the force exerted by the binding means, an evenly distributed pressure is generated, allowing the mirror pane to assume a predetermined, angularly displaced position relative to the vehicle. By means of a motor, which is encapsulated, for example, within the mirror structure, or by manual effort, the said angular positioning is conveniently adjustable. For such sliding structures, components of hard plastic are normally employed.

Because the frictional resistance of a stationary object, as a rule, is greater than the resistance evidenced when the object is in a sliding motion, a so-called "Stick and Slip" effect is created, the characteristics of which conform, more or less, to characteristics of the employed plastic sliding pair of surfaces. In other words, the force to induce movement between contacting, stationary components relative to one another, is markedly greater at the start than after sliding has been established. Thus, a specific defining of the degree of displacement of a mirror having such a sliding structure can be difficult, if not entirely impossible. As a disadvantage, in the case of a motorized displacement, it is a necessity to design the drive mechanism to generate a force great enough to overcome the initial resistance of a still-standing mirror pane, but is not reduced thereafter.

In order to reduce the said fictional resistance, that is, to achieve appropriate friction conditions between the sliding components, as a rule, the material of the sliding parts, or better, of the surfaces thereof, remains subject to trial and error until the desired characteristics are found. The conventional product is one in which a uniform, geometrically flat surface is obtained. This is of little value, if the surfaces of the material pairings must also be made to compensate for a reduction of the said Stick and Slip effect. For example, the structural strength of the material and/or its operational life might be given insufficient attention.

In view of the above stated consideration, it is an object of the present invention to make available a sliding structure which operates by means of a uniformly distributed force to also include the construction of linkage apparatus utilizing such a sliding structure.

Because a sliding surface, in the case of the invented structure, is composed of the free ends of a multiplicity of projections which impinge against a flat opposed sliding surface, a plurality of contact areas on the said free ends of the projections becomes available. By means of appropriate dimensioning of additional tangentially disposed, contact areas at the free-ends of the projections, and by means of a variation in the number of such projections per surface unit, it is possible that the difference between stationary friction and sliding friction in the case of pairs of selected material(s) can be considerably reduced. The force, which is necessary for setting two matched, stationary pairs into a motion relative to one another, then becomes greater, but only imperceptibly so, than the force required for overcoming in motion resistance.

The known Stick and Slip effect, which cannot be avoided in the case of material pairs in which the friction characteristics are unfavorable, can be effectively reduced by the use of the above mentioned projections. This has the eventual result, that the materials employed can be advantageously selected on the basis of advantageous properties, notably, for example, strength of material and/or corrosion resistance. In this way, an unfavorable installation of an alternate and/or an additional sliding component or an auxiliary contacting layer can be eliminated.

As is the case with other contingent surfaces of sliding parts, a relative motion of parts moving in different directions can be carried out. In accord with the formation of the sliding parts, i.e., with the contour of, first a designed sliding surface and, second, that of a thereagainst contacting surface, respectively, a straight-line, a rotational or a spatially extended sliding area may be obtained. The relative movement of two mutually sliding components can be executed at different speeds. Especially well adapted is a speed less than a maximum of 250 mm/sec during the operation of the sliding structures of the invention.

The invented sliding structure is particularly well suited for installation in the case of external rear view mirror adjustment apparatuses, since, as one advantage, positioning of the mirror pane can be done in a manner as free as possible from hysteresis-lag.

The sliding structure, in accord with the invention, is particularly well adapted for slide-bearings composed of plastics, since, due to the slide characteristics of plastic pairs, the disadvantageous Stick-Slip effect can be considered as being practically eliminated.

The mutually contacting sliding surfaces can extend themselves over various spatial conformations, in particular such surfaces can appear as shell-like or as cup-like hemispherical shapes and accordingly can be used in conventional mirror positioning apparatuses.

In accord with an advantageous embodiment of the invention, the free exposed ends of the projections, i.e., the actual sliding surface of a component, may be rounded off to present a convex contacting surface. Because of the convex shaping, indentations, formed by the projections, into the smooth surface of the opposing sliding component are avoided. Such an impingement of the projections of one sliding piece into the face of an opposing piece would impair a smooth motion of the two components in reference to one another.

In accord with the combined area of the projections, that is to say, the area of the above described sliding surface, the total areal extent of the free ends of the projections can be along a plane or along a contour which is complementary to that of an opposing sliding surface.

The height of the projections is dependent upon the current application and upon the employed material-pairing, and is in a range of 1 mm to 0.01 mm.

An advantageous embodiment provides that projections may appear on both matching sliding surfaces. Here, the projections of the first part are so arranged, that the actual, projections rising from its base surface slide on the opposing base surface, i.e., slide between the projections thereon, and vice-versa. This arrangement can be of advantage in certain applications.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the concept which provides contacting surfaces which require a force to overcome static friction therebetween, which is only fractionally greater than the force necessary to overcome dynamic or sliding friction therebetween, will be described in more detail.

Figure 1:
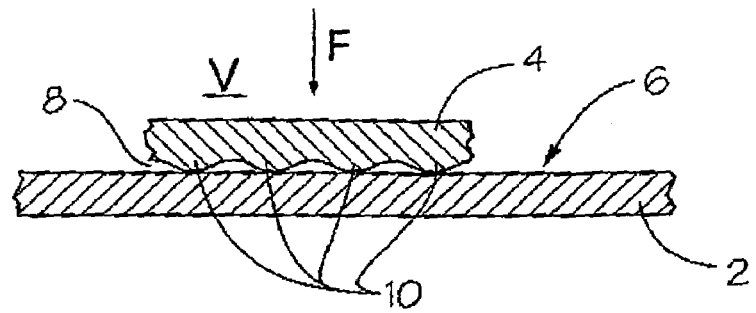
FIG. 1 is a side sectional view of the invented sliding structure.

FIG. 1 is a cutaway sectional view showing the principal construction and the function of the present invention. The sliding structure encompasses a first sliding part 2 and a second sliding part 4 lying thereon. The first sliding part 2 has a first, flat sliding surface 6. The second sliding part 4 includes a flat basic surface 8, from which extend upward a plurality of projections 10, wherein each projection has a free end. On the free ends of the projections 10 are shown contact surfaces 12, which lie against the first sliding surface 6. The two sliding parts 2, 4 are pressed against one another by the force F, so that a frictional resistance arises when the parts are caused to slide against one another.

Figure 2:
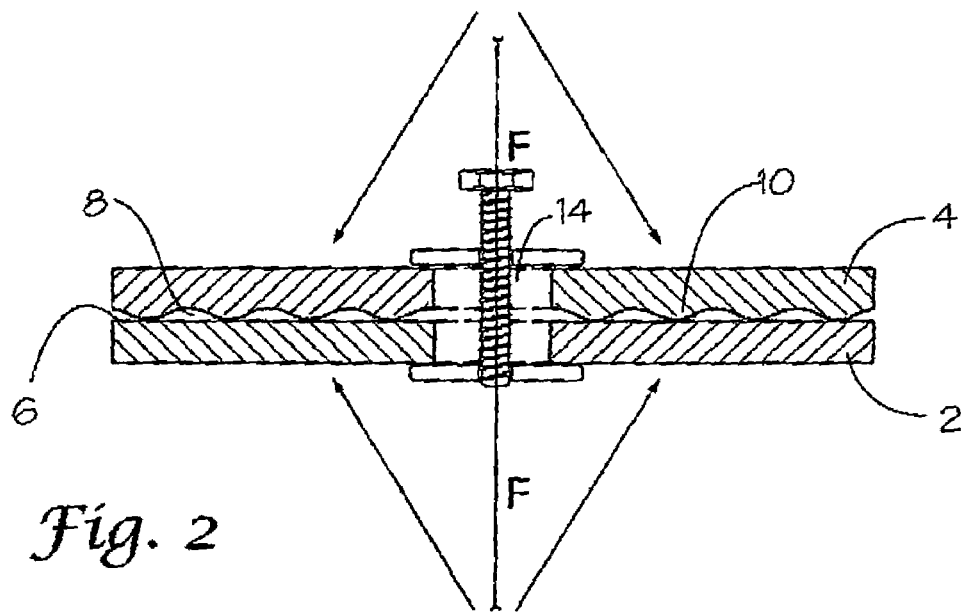
FIG. 2 is a side sectional view of the invented sliding structure with a connection means.

FIG. 2 shows an exemplary arrangement wherein the two flat sliding parts 2, 4, as exhibited in FIG. 1, can be held together. For this purpose, the two sliding parts 2, 4 are penetrated by a central bore 14 through which a screw or a set-bolt can be inserted. The two sliding parts 2, 4 could also be rotated about a pivoting pin or axle running through bore 14. In a construction wherein the central bore is actually oval or elongated, a longitudinal movement of the two sliding parts 2, 4 relative to one another along the major axis of the bore is possible.

Figure 3:
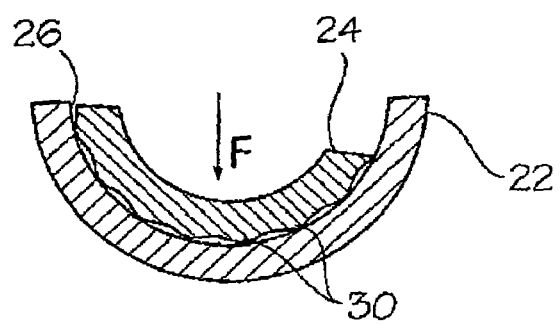
FIG. 3 is a side sectional view of the invention in combination with cylindrical sliding surfaces.

FIG. 3 depicts an arrangement of the invention, having cylindrical sliding parts. The sliding structure in this case includes a first and a second cylindrical sliding part, namely 22, 24. In this case, the first sliding part 22 possesses a smooth, internal sliding surface 26 on its concave side. The second sliding part 24 has its sliding surface 28, conversely on its convex side, from which a plurality of projections 30 radially extend, thus exposing their free ends 32 as illustrated in FIG. 4A, 4B, 4C or 4D. Thus, the projections 30 lie with their free end surfaces 32 in sliding contact with the concave surface 28 of the first cylindrical sliding part 22.

Normally, the projections 10, 30, including the contact surfaces, 12, 32, are between 1 mm and 0.01 mm in height. The projections are normally conically shaped so that the area of cross-section of a surface across the midpoint of a projection is less than 50% of the areal value of the base surface.

The projections are arranged over the flat basic surface 8, 28 within a range of 0.1 to 100 per square centimeter.

Figures 4A, 4B, 4C, 4D:
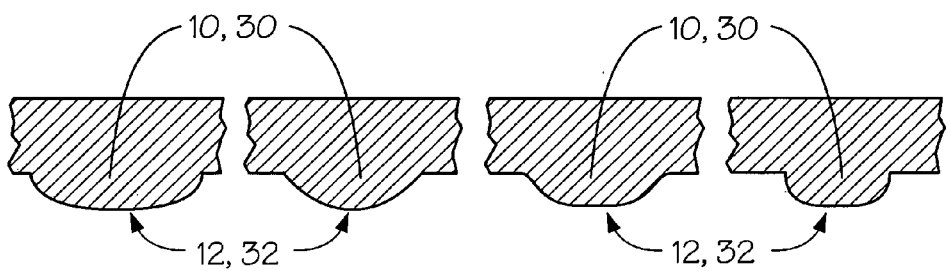
FIG. 4A is a side sectional view of a projection of the invention having an elliptical shape.
FIG. 4B is a side sectional view of an alternative projection of the invention having a hemispherical contact surface.
FIG. 4C is a side sectional view of an alternative projection having a rounded frustum of conical shape.
FIG. 4D is a side sectional view of an alternative projection having a truncated contact surface.

FIGS. 4A, 4B, 4C and 4D, show four exemplary shapes for the free ends of the projections 10 or 30. FIG. 4A presents projections generally elliptic in cross section. In particular, FIG. 4B, has hemispherical or cup shaped projections. FIG. 4C shows a projection which possesses a rounded frustum of a conical shaped projection with a flat tangential tip or contact surface 12, 32. FIG. 4D shows a projection in the shape of a rounded-off cylindrical shell with a flat, truncated sliding or contact surface, again 12, 32. The various projection shapes can be applied as sliding contacts against the matching sliding surface, i.e. basic surface of the respective opposed part.

Figure 5A:
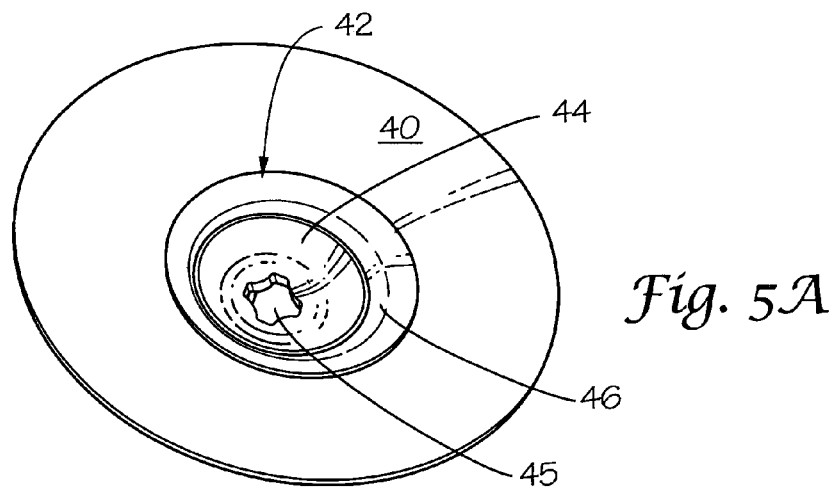
FIG. 5A is a perspective view of a sliding structure having an approximately hemispherical plate and pressure plate of an exemplary mirror positioning apparatus in accord with the present invention.
Figure 5B:
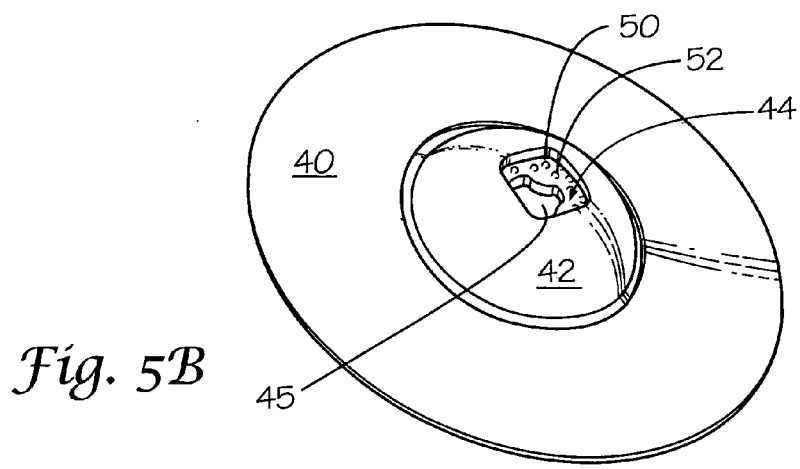
FIG. 5B is a perspective view of the arrangement of FIG. 5A as seen from below.
Figure 6:
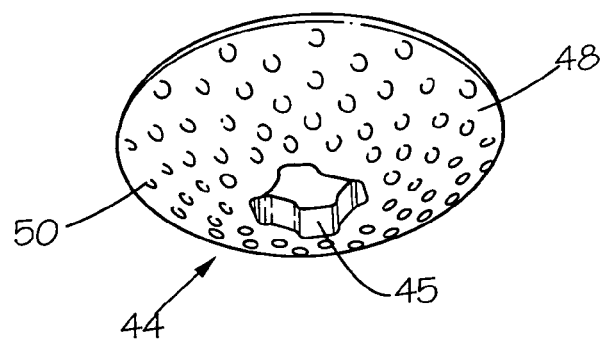
FIG. 6 a perspective view of hemispherical pressure plate with projections, and, FIG. 7 is an exploded view of the arrangement in accord with FIGS. 5A, 5B.
Figure 7:
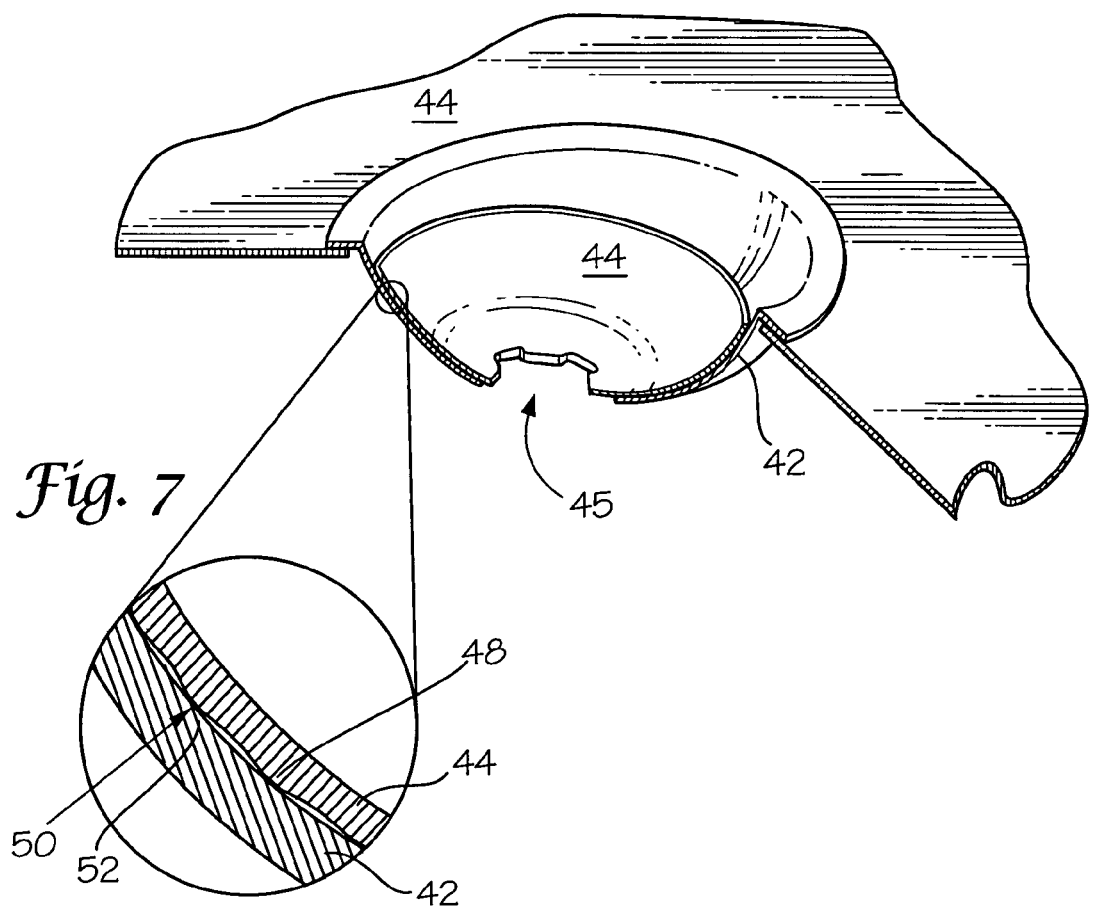

FIGS. 5 to 7 show a spherically curved plate and an auxiliary pressure plate of an exemplary mirror positioning apparatus for an outside, rear view mirror of a commercial vehicle, into which the invented sliding structure is integrated. FIGS. 5A and 5B exhibit an annular, spherically curved plate section 40 which integrally surrounds the rim of a convex (as seen from the top) hemispherical plate 42, which is aligned against an internal matching pressure plate 44. Pressure plate 44 is in the form of a hemispherical cup which opens upward—again in accord with the drawing. Both the hemispherical plate 42 as well as the therein placed pressure plate 44 are penetrated by a common central boring 45 to allow passage of a connection means, to bring together the plate 40 (with its extended hemispherical plate 42) and the above situated pressure plate 44 under a predetermined pressure. The concave surface of the hemispherical spherical pressure plate 42, forms a first, smooth surface 46. The convex side of the cup-like pressure plate 44 forms a base surface 48 from which a plurality of projections 50 with free end sliding surfaces 52 extend. Projections 50 may be in the forms shown in FIG. 4A, 4B, 4C or 4D either as a single configuration or as a combination of configurations using two or more of the configurations shown. The projections 50, or, more exactly, their said respective free end sliding surfaces 52, are pressed against the first sliding surface 46. The spherical plate 42 thus presents the first sliding part and the pressure plate 44 with the projections 50 represents the second sliding part of this hemispherical sliding structure.

The connecting member maintains the sliding parts 2, 4, 22, 24 in contact or together under a retaining force or surface pressure which is less than 10 N/mm². This force provides a surface pressure which is less than 75% of the allowable surface pressure of the material selected even if this material is one considered to have a low resistance to pressure.

The arrangement of the projections 10, 30, 50 on the respective base surfaces 8, 28, 48 can be individually designed having a low density of projections per surface unit wherein each projection contacts the oppositely disposed contingent surface, or to have a high density of projections per surface unit performing in the same manner.

While a preferred embodiment of the invention has been described using specific terms, such description is for illustrative purposes only, and it is to be understood that changes and variations may be made without departing from the spirit or scope of the following claims.

What is claimed:

1. A mirror adjustment apparatus including a sliding structure forming a movable connection between at least two components, comprising:
    a first spherically curved sliding part having a first sliding surface and a central bore;
    a second spherically curved sliding part having a second sliding surface facing and complementary of said first sliding surface and a central bore;
    a connector passing through said central bores binding said first and second sliding surfaces together under pressure, which is less than 10 N/mm$^2$; and
    one of said first and second of said sliding surfaces having a base surface having a plurality of projections each being rounded off to present a convex surface having tangential sliding surfaces in sliding contact with and complementary of, the oppositely disposed sliding surface forming a contact surface contacting the other of said first and second of said sliding surfaces;
    such that the force required to overcome the static friction between said first and second sliding surfaces is increased, but is only slightly greater than the force necessary to overcome sliding friction, thus substantially eliminating hysteresis-lag.

2. The sliding structure of claim 1 wherein the sliding surfaces are flat.

3. The sliding structure of claim 1 wherein the sliding surfaces are in the shape of the outer casing of a circular cylinder.

4. The sliding structure of claim 1 wherein the sliding surfaces are shell-like.

5. The sliding structure of claim 1 wherein the area of a cross-section of a surface in a position, which represents one-half of the height of a projection above the base surface, is less than 50% of the areal value of the base surface area.

6. The sliding structure of claim 1 wherein the number of the projections per square centimeter is a ratio within a range of 0.1 to 100.

7. The sliding structure of claim 1, wherein the number of projections per areal unit is constant over the entire sliding area.

8. The sliding structure of claim 1 wherein said first material in both sliding parts consist of a different material than said second material different materials, at least in the area of the sliding surfaces.

* * * * *